(12) United States Patent
Lin

(10) Patent No.: US 7,497,652 B2
(45) Date of Patent: Mar. 3, 2009

(54) PLASTIC FASTENING DEVICE

(75) Inventor: Chen-Mao Lin, Tainan Hsien (TW)

(73) Assignee: Tech Stell Co., Ltd., Tainan Hsien (TW)

( * ) Notice: Subject to any disclaimer, the term of this patent is extended or adjusted under 35 U.S.C. 154(b) by 494 days.

(21) Appl. No.: 11/359,599

(22) Filed: Feb. 23, 2006

(65) Prior Publication Data

US 2007/0196195 A1    Aug. 23, 2007

(51) Int. Cl.
*F16B 39/282* (2006.01)
*F16B 37/04* (2006.01)

(52) U.S. Cl. .................. 411/145; 411/132; 411/163; 411/183

(58) Field of Classification Search .......... 411/145, 411/132, 136, 143, 144, 163, 183–189
See application file for complete search history.

(56) References Cited

U.S. PATENT DOCUMENTS

| | | | | |
|---|---|---|---|---|
| 80,034 A | * | 7/1868 | Towne | 411/143 |
| 2,763,312 A | * | 9/1956 | Redmer | 411/134 |
| 2,868,256 A | * | 1/1959 | Poupitch | 411/134 |
| 3,342,235 A | * | 9/1967 | Pylypyshyn | 411/134 |
| 3,390,713 A | * | 7/1968 | Gutshall | 411/154 |
| 3,417,802 A | * | 12/1968 | Oldenkott | 411/134 |
| 3,895,663 A | * | 7/1975 | Bashline et al. | 411/136 |
| 4,134,438 A | * | 1/1979 | Frieberg et al. | 411/163 |
| 5,090,855 A | * | 2/1992 | Terry | 411/144 |
| 6,776,565 B2 | * | 8/2004 | Chang | 411/136 |

* cited by examiner

*Primary Examiner*—Victor Batson
*Assistant Examiner*—David C Reese
(74) *Attorney, Agent, or Firm*—Leong C. Lei

(57) ABSTRACT

A novel plastic fastening device is provided herein, which mainly contains a bolt, a nut, and at least a washer. On the surface of the washer that interfaces with the object being fastened, a number of small wedges are arranged radially with equal spacing therebetween. Inside at least one of the small wedges, a plate is embedded vertically with a saw-toothed edge facing towards the object being fastened. When the bolt and nut are screwed together and the small wedges on the washer are pressed against the object, the pointed edges of the small wedges are deformed, and the saw teeth of the embedded plate is exposed and driven into the object for a superior fastening effect.

4 Claims, 4 Drawing Sheets

PLASTIC FASTENING DEVICE

BACKGROUND OF THE INVENTION (a) Technical Field of the Invention

The present invention generally relates to fastening devices, and more particularly to a plastic fastening device comprising a bolt, a nut, and at least a washer where the washer contains a saw-toothed plate inside for enhanced reliability.

(b) Description of the Prior Art

Plastic bolts and nuts are provided for applications requiring both fastening and electrical insulation. In addition to its insulating property, the plastic fastening device has a number of advantages such as lightweight and inactivity, in comparison its metallic counterparts. However, plastic bolts and nuts have limited strength and therefore are applied only when light workload is involved. Additionally, under vibration or external force, plastic bolts and nuts may be deformed and become loosed, reducing their applicability significantly.

SUMMARY OF THE INVENTION

The primary purpose of the present invention is to a novel plastic fastening device is provided herein, which provides enhanced fastening reliability.

The plastic fastening device according to the present invention mainly contains a bolt, a nut, and at least a washer. On the surface of the washer that interfaces with the object being fastened, a number of small wedges are arranged radially with equal spacing therebetween. Inside at least one of the small wedges, a plate is embedded vertically with a saw-toothed edge facing towards the object being fastened. When the bolt and nut are screwed together and the small wedges on the washer are pressed against the object, the pointed edges of the small wedges are deformed, and the saw teeth of the embedded plate is exposed and driven into the object for a superior fastening effect.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
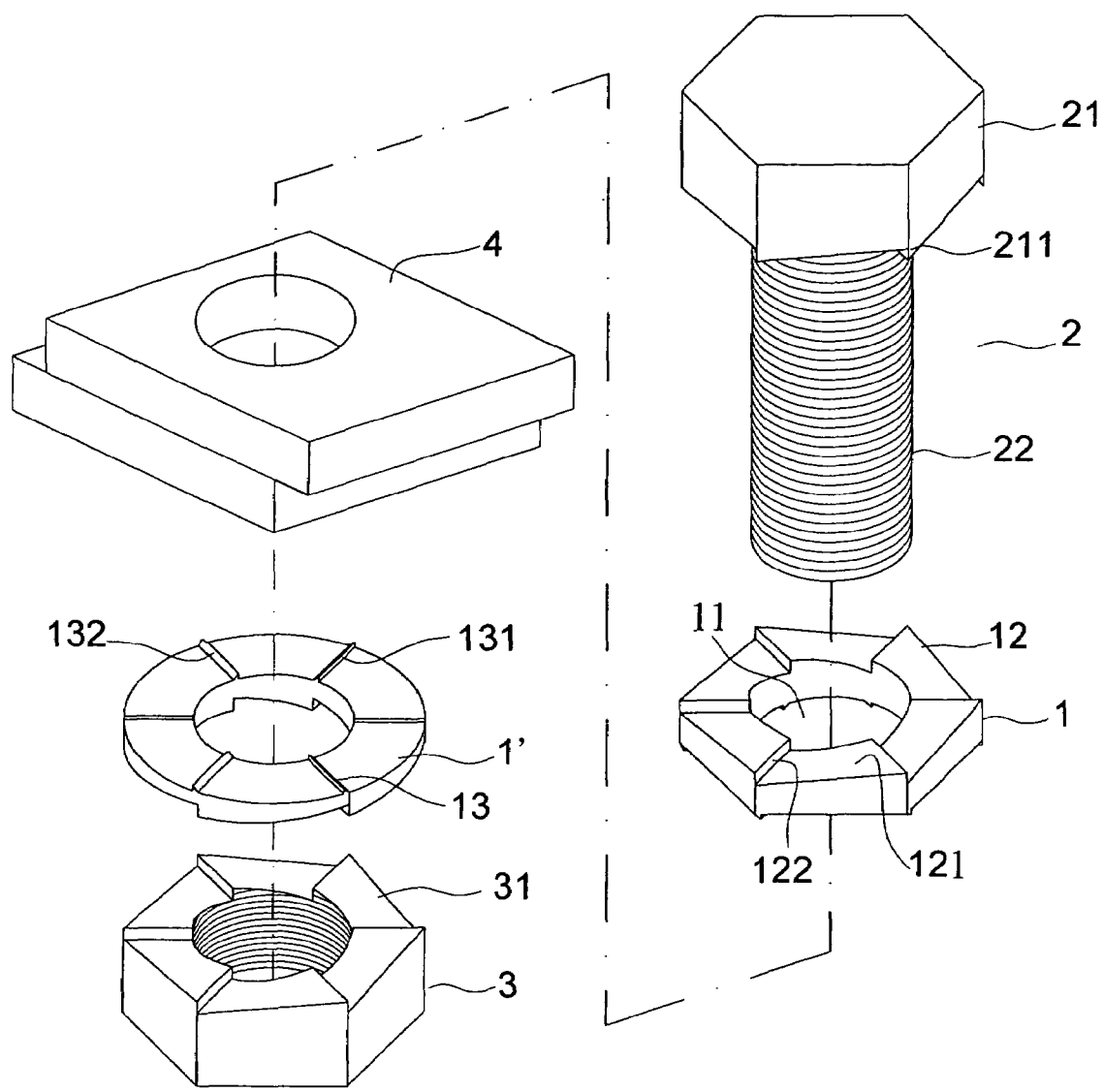
FIG. 1 is a perspective exploded view showing the various components of the plastic fastening device according to an embodiment of the present invention.
Figure 2:
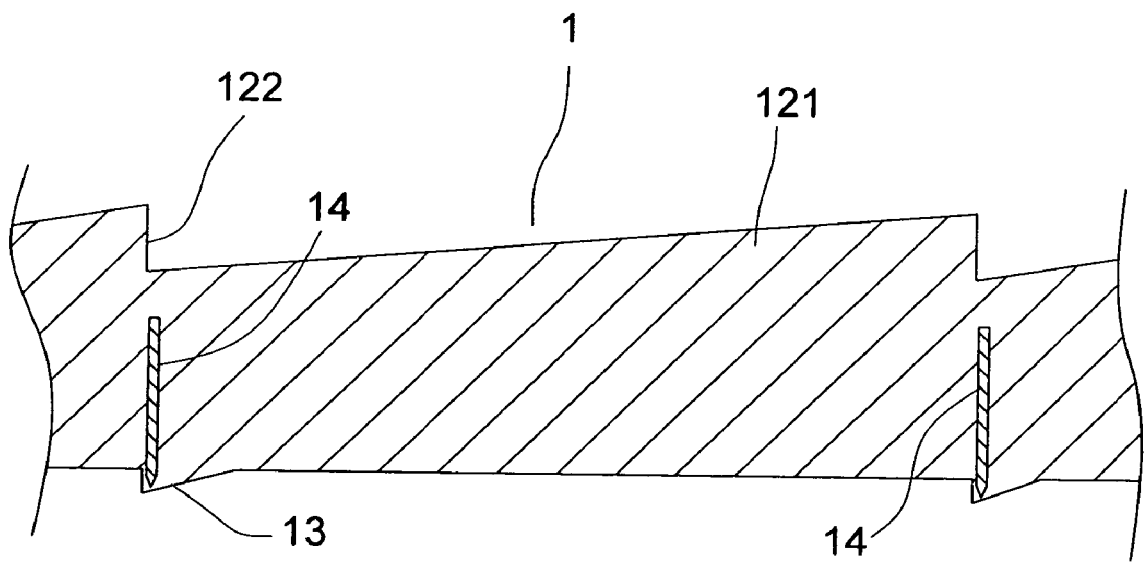
FIG. 2 is a sectional view showing the washer of the plastic fastening device of FIG. 1.

As shown in FIGS. 1 and 2, the plastic fastening device according to an embodiment of the present invention mainly contains a bolt 2, a nut 3, and two washers 1 and 1'. The washers 1 and 1' are identical and in the following only washer 1 is described whose details are applied to the washer 1' as well.

Figure 3:
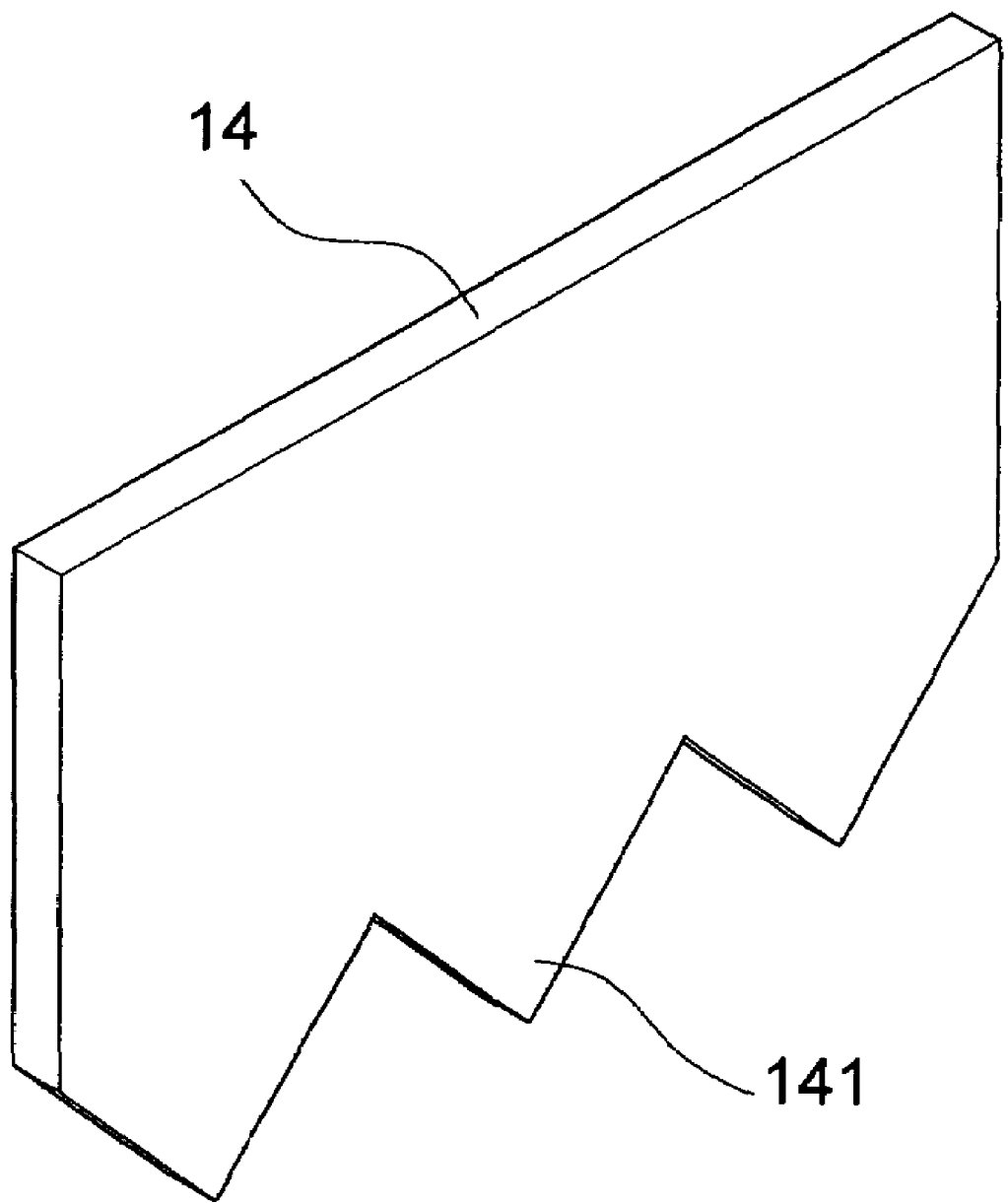
FIG. 3 is a perspective view showing the saw-toothed plate embedded inside the washer of FIG. 2.

The washer 1 has a flat body with a center through hole 11 which is slightly larger than the diameter of the shank 22 of the bolt 2. On a top surface of the washer 1, a number of first wedges 12, each having an elongated slop side 121 and a vertical side 122, are arranged sequentially into a ring around the center through hole 11. Each of the first wedges 12 has its slop side 121 slanted towards the bottom of the vertical side 122 of a neighboring first wedge 12. On a bottom surface opposite to the top surface of the washer 1, a number of small wedges 13, each having a slop side 132 and a vertical side 131, are arranged radially around the center through hole 11 with equal spacing therebetween. At least one of the small wedges 13 has a plate 14 embedded inside. The plate 14 extends vertically from the body of the washer 1 into the small wedge 13 in alignment with the pointed edge of the small wedge 13. The plate 14 has saw teeth 141 (shown in FIG. 3) configured on the edge adjacent to the pointed edge of the washer 1 and facing downward towards the object 4. The plate 14 is installed when the washer 1 is molded, whose purpose is to reinforce the strength of the small wedges 13. Please note that the slope sides 121 of the first wedges 12 slant towards the fastening direction of the bolt 2 while the slop sides 132 of the small wedges 13 slant towards the opposite direction.

The bolt 2 contains a head 21 and a shank 22. The head 21 could have any appropriate shape for the operation of hand tools. On the bottom surface of the head 21 where the shank 22 is extended, a number of second wedges 211, corresponding to the first wedges 12 on the washer 1, are arranged sequentially into a ring around the shank 22. However, the slope sides (not shown) of the second wedges 211 slant towards a direction opposite to that of the slope sides 121 of the first wedges 12.

The nut 3 also could have any appropriate shape. On a top surface of the nut 3, a number of third wedges 31, corresponding to the first wedges 12 on the washer 1', are arranged sequentially into a ring around a center through hole (not numbered). However, the slope sides (not numbered) of the third wedges 31 slant towards a direction opposite to that of the slope sides 121 of the first wedges 12.

Figure 4:
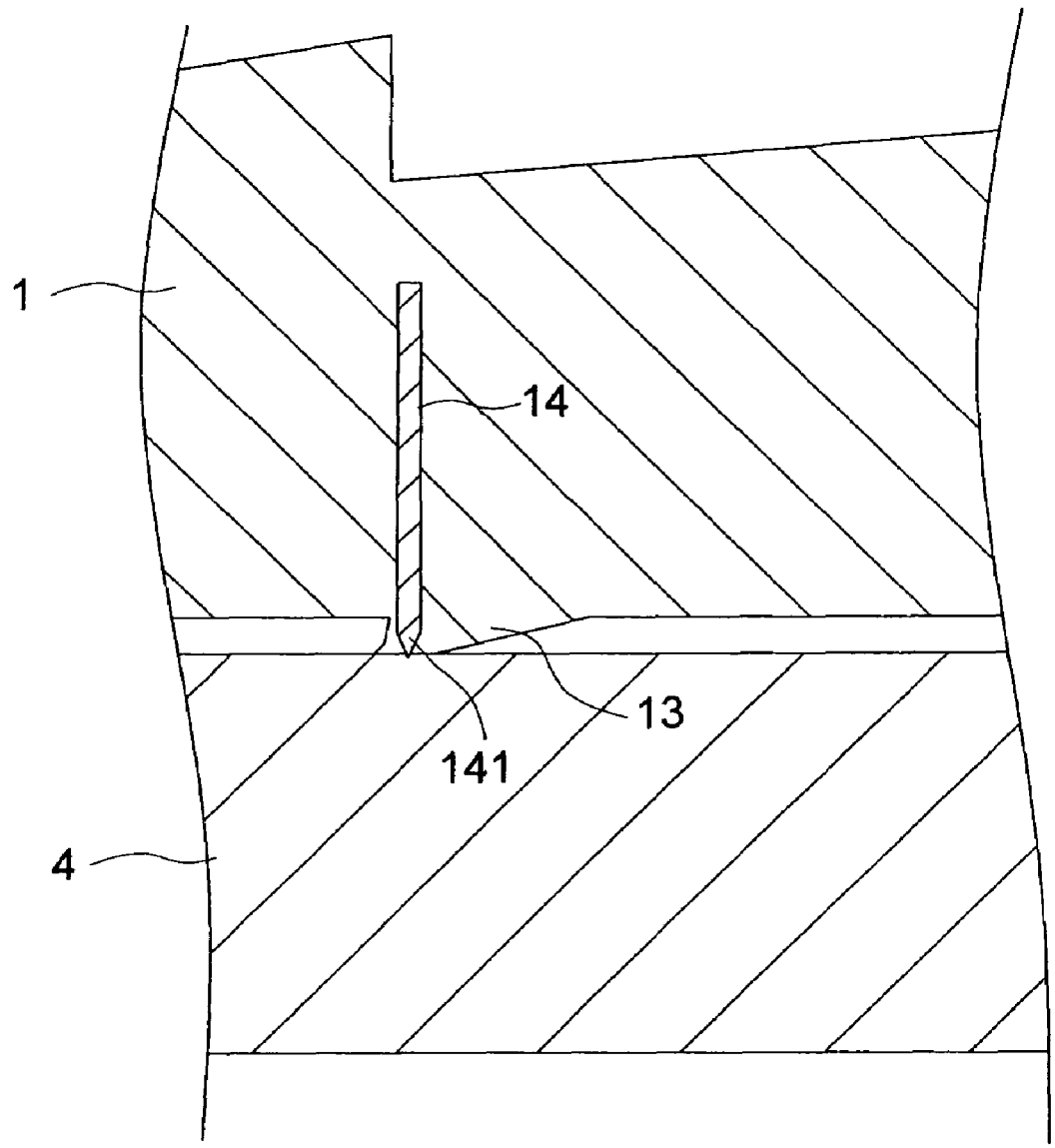
FIG. 4 is a sectional view showing the interface between the washer of FIG. 2 and the object being fastened.

As shown in FIG. 1, when the fastening device is put to use, the washer 1 and 1' are positioned so that their small wedges 13 facing towards the object 4 to be fastened, and then the bolt 2 is threaded sequentially through the washer 1, the object 4, the washer 1', and the nut 3. When the bolt 2 is fastened, its head 21 or the nut 3 drives the washers 1 and 1' to press against the object 4. When the driving force exceeds the strength of the small wedges 13, the pointed edges of the small wedges 13 are deformed or bended so that the saw teeth 141 of the plates 14 are exposed and driven into the surface of the object 4, as illustrated in FIG. 4. As such, the bolt 2, the washer 1, the object 4, the washer 1', and the nut 3 are tightly joined together. And, even if the bolt head 21 or the nut 3 is to be turned loosed by vibration or external force, the fastening device would remain reliably fastened as the slope sides of the components offload the exerted force and the saw teeth 141 is jammed into the surface of the object 4.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A plastic fastening device, comprising a bolt, a nut, and at least one washer; wherein at least one small wedge is provided on a surface of said at least one washer that interfaces with an object being fastened; said at least one small wedge has a plate embedded vertically inside; and, when said bolt and said nut are screwed together and said at least one small wedge on said at least one washer are pressed against said object, a pointed edge of said at least one small wedge is deformed and said embedded plate is exposed and driven into said object for a reliable fastening effect.

2. The plastic fastening device according to claim 1, wherein said at least one small wedge is arranged radially with equal spacing therebetween around a center through hole of said at least one washer.

3. The plastic fastening device according to claim 1, wherein said plate extends from a body of said at least one washer into said at least one small wedge.

4. The plastic fastening device according to claim 1, wherein said plate has a saw-toothed edge facing towards said object being fastened and adjacent to the pointed edge of said at least one small wedge.

* * * * *